United States Patent Office 2,891,033
Patented June 16, 1959

2,891,033

PROCESS FOR THE PREPARATION OF FLAME-RETARDANT SILICONE RUBBER AND COMPOSITION THEREOF

Richard M. Savage, Latham, N.Y., assignor to General Electric Company, a corporation of New York No Drawing. Application February 7, 1956
Serial No. 563,838

17 Claims. (Cl. 260—37)

This invention is concerned with organopolysiloxanes having improved flame-retardant properties. More particularly, the invention is concerned with a composition of matter which in the cured state exhibits improved flame-retardant properties, which composition comprises (1) an organopolysiloxane convertible to the cured, solid, elastic state consisting essentially of silicon atoms, oxygen atoms, methyl groups, and an aromatic radical selected from the class consisting of aryl and halogenated aryl radicals, the said organopolysiloxane containing from 3 to 35 mol percent silicon-bonded aryl or halogenated aryl groups of the total number of silicon-bonded organic groups, there being present from 1.98 to 2.05 organic groups per silicon atom, (2) a finely divided inorganic filler, and (3) a finely divided cupreous material present in amounts sufficient to impart flame-retardant properties to the cured, solid, elastic organopolysiloxane, the said cupreous material being selected from the class consisting of copper, copper halides (both cupric and cuprous halides), copper oxides (e.g., cuprous oxide, cupric oxide, etc.), and mixtures of the aforesaid cupreous materials.

Vulcanized (or cured), solid, elastic organopolysiloxanes (for brevity hereinafter referred to as "silicone rubbers"), whether vulcanized by means of heat in the presence of organic peroxides or other organic curing agents, or when vulcanized in accordance with high energy electrons described in Lawton and Bueche patent application Serial No. 291,542, filed June 3, 1952, are known to have good heat resistance at elevated temperatures of from 150 to 200° C. or higher. However, in certain applications, particularly in coating applications, it has been found that these silicone rubbers, at temperatures encountered by direct contact with an open flame, do not have the desired flame retardancy properties which some applications may require when the silicone rubber is ignited.

Due to the presence of organic groups in the organopolysiloxane structure, once a flame is applied to silicone rubber, even though it is filled with an inorganic filler such as finely divided forms of silicon dioxide or calcium carbonate, the silicone rubber will continue to burn unless extinguished by external means, and will be ultimately almost 100% consumed. Conditions of this type where flame retardancy is an important requirement of a molded or extruded article may be found in the aircraft and other industries, particularly in connection with grommets, seals or gaskets; or as insulation on electrical conductors where high degrees of flame-retardancy are an essential requirement.

I have now discovered that I am able to improve the flame-retardant properties of silicone rubber by incorporating therein varying amounts, for instance, from about 0.25 to 20%, by weight, based on the weight of the convertible organopolysiloxane, of a cupreous material selected from the class consisting of finely divided copper, cuprous oxide, cupric oxide, copper halides, and mixtures of said cupreous materials, in which the proportions of the cupreous material are that described above. By means of the incorporation of minor amounts of the cupreous material, I am able to greatly improve the flame-retardant properties of the silicone rubber. In the absence of the finely divided cupreous material, the silicone rubber generally will burn, even though there are present in the silicone rubber relatively large amounts of inorganic flame-resistant fillers. The fact that these cupreous materials have the ability to improve the flame-retardant properties of the filled silicone rubber was unexpectedly and unpredictably found to be specific to the finely divided cupreous material, since the use of other flame-retardant materials, particularly other flame-retardant inorganic additives either in the form of a salt or in the form of metallic oxides, were either not as effective in the silicone rubber for this purpose, or else could not take the curing temperatures required for the silicone rubber, or could not advantageously be used in an application for the silicone rubber, or else adversely affected the properties of the cured silicone rubber.

In the specification and in the claims, the convertible methyl arylpolysiloxanes, which may be viscous masses or gummy solids, depending on the state of condensation, will hereinafter be referred to as "convertible organopolysiloxane" or more specifically as "convertible methyl phenylpolysiloxane." Although convertible organopolysiloxanes with which the present invention is concerned are now well known in the art, for purposes of showing persons skilled in the art the various convertible organopolysiloxanes which may be employed in the practice of the present invention, attention is directed to the above-described convertible organopolysiloxanes preferably disclosed in Sprung Patent 2,484,595, issued October 11, 1949, as well as in Warrick Patent 2,460,795. The aromatic group of the convertible organopolysiloxanes may be, e. g., phenyl, tolyl, xylyl, naphthyl, biphenyl, chlorophenyl, tetrachlorophenyl, etc., radicals connected to the silicon atoms by carbon-silicon linkages. The particular convertible organopolysiloxane used in the practice of this invention is critical. Such organopolysiloxanes are advantageously obtained by condensing a diorganodihydrolyzable silane, for instance, dimethyldichlorosilane, with diphenyldichlorosilane, or mixtures of dimethyldichlorosilane with methyl phenyldichlorosilane, etc. (with or without the presence of small amounts of monoorganotrihydrolyzable silanes or triorganomonohydrolyzable silanes, e.g., methyltrichlorosilane, trimethylchlorosilane, etc.), and thereafter effecting condensation of the hydrolysis product using a condensing agent, for instance, an alkaline condensing agent such as potassium hydroxide, sodium hydroxide, etc., or an acidic condensing agent of the type such as ferric chloride, etc.

Alternately, cyclic polymers of dimethyl siloxane with either cyclic polymers of diphenyl siloxane or cyclic polymers of methyl phenylsiloxane may be intercondensed with, e.g., alkaline condensing agents to give the desired methyl phenylpolysiloxane convertible to the cured, solid, elastic state. The presence of intercondensed monomethylsiloxy and trimethylsiloxy units, as well as small amounts of silicon-bonded vinyl groups, is not precluded. No matter how made, the convertible organopolysiloxane should contain from 5 to 35 mol percent silicon-bonded aromatic groups.

Generally, the convertible organoplysiloxane comprises the recurring structural unit RR'SiO where R and R' are selected from the class consisting of methyl and the aforementioned aromatic halogenated or unhalogenated radicals. When making the convertible organopolysiloxane by intercondensation, the organopolysiloxanes from which the heat-curable organopolysiloxanes are prepared should contain an average of from about 1.98 to 2.01 organic groups per silicon atom, and that more than 98 percent of the silicon atoms of the polysiloxane contain two silicon-bonded organic groups of the above class. There may be intercondensed with the convertible organopolysiloxane siloxy units containing from 0 to 2 mol percent silicon-bonded vinyl groups in the form of divinylsiloxy units, methyl vinylsiloxy units, aryl vinylsiloxy units or halogenated aryl vinyl siloxy units. Examples of such vinyl siloxy units are

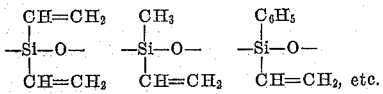

as is described, for example, in Marsden Patent 2,445,794, issued July 27, 1948.

The cupreous materials employed in the practice of the present invention are generally those commercially available on the market. The cupreous powder employed is generally in the form of a finely divided state and preferably has an average particle size of only a few microns. For optimum results, from 95 to 100 percent of the particles should go through a 325-mesh screen when measured by the United States standard sieve series (A.S.T.M. standard). When thus passing through the 325 U.S. sieve, the average particle size expressed in microns is less than 44 microns. A more detailed description of what is meant by U.S. sieve members is found in U.S. Patent 2,466,412, issued April 5, 1949, and assigned to the same assignee as the present invention, particularly in column 3, line 43 to column 4, line 13 of the said patent.

In addition to the copper powder which must for optimum results have the particle size recited above, namely, must be capable of passing through a U.S. sieve #325 and has essentially 100 percent of the particles having an average particle diameter of less than 44 microns and preferably within the range of 100 percent of the particles having an average particle diameter of between 1 to 15 or 20 microns, the cupreous material may consist of friable metallic copper core particles surrounded by protective surface film of cuprous oxide, said film being relatively thin as compared with the size of the enclosed copper cores, the amount of cuprous oxide on the copper particle cores being at least sufficient to be identified by present X-ray diffraction methods. This particular cupreous mixture of copper and copper oxides employed in the practice of the present invention, and methods of preparing the same, are more specifically disclosed and claimed in Hubbell Patent 2,420,540, issued May 13, 1947.

Generally, it is desirable that the cupreous material be employed in the finely ground state and, for this purpose, it is desirable to use a cupreous material having an average particle size below about 15 microns. Although somewhat coarser particles of a larger average particle size may be employed, it is generally desirable to keep the particle size as fine as possible in order to avoid any adverse effects on the physical properties of the cured organopolysiloxanes, such as tensile strength, elongation, and tear strength.

In preparing the compositions herein defined, various fillers may be employed as, for instance, finely divided silicas, for instance, silica aerogel, fume silica, diatomaceous earth, titanium dioxide, lithopone, fillers treated with, e.g., trimethylchlorosilane, etc. The amount of filler employed may be varied widely and may comprise, for instance, from about 25 to 300 percent of the weight of the convertible organopolysiloxane. The exact amount of filler employed will depend upon such factors as, e.g., the application for which the convertible organopolysiloxane is intended, the type of organopolysiloxane and filler employed, etc.

In order to accelerate the cure of the convertible organopolysiloxane, it is desirable to add to the latter various curing agents, for example, benzoyl peroxide, tertiary butyl perbenzoate, bis-(2,4-dichlorobenzoyl) peroxide, etc. These curing agents may be present in varying amounts ranging from about 0.3 to as high as 6 to 10 percent, by weight, or more, based on the weight of the convertible organopolysiloxane. Instead of employing chemical curing agents to vulcanize the convertible organopolysiloxane, one may employ high energy electrons in accordance with the process disclosed and claimed in the above-mentioned Lawton and Bueche application Serial No. 291,542.

The flame-retardant compositions herein defined, when employed for coating purposes, may be coated on by either dipping, knifing, spraying, etc. This may be accomplished by mixing on the usual apparatus, for instance, dough mixers, etc., or on rolls, the convertible organopolysiloxane, the filler, the cupreous material, and the curing agent, if any, and, if desired, making a mixture of these ingredients with a solvent for the convertible organopolysiloxane, for instance, toluene, benzene, xylene, etc., to a solids content of about 15 to 60 percent solids. Alternatively, the mixture of convertible organopolysiloxane, filler, curing agent, if any, and cupreous material may be employed in coating applications without using any dispersing or solvent phase. This solution-dispersion mixture (in which the liquid phase is preferably a solvent for the organopolysiloxane) or liquid-free mixture can then be applied to various inorganic fibrous substrata, such as, for instance, glass cloth, asbestos cloth, quartz fiber cloth, etc., in thin coats of, for example, 2 to 10 mils or more, and thereafter cured at temperatures ranging from about 125 to 200° C. for a time ranging from 5 to 15 minutes. Thereafter, additional curing of the coated surfaces may be effected by further heat treatment at a temperature of the order of about 200 to 300° C. for a time ranging from about a few minutes to even several hours to effect complete conversion of the convertible organopolysiloxane to the substantially infusible and insoluble state. Curing with high energy electrons may also be employed obviating the necessity of using chemical curing agents and heat.

In order that those skilled in the art may better understand how the present invention may be practiced, the following examples are given by way of illustration and not by way of limitation. All parts are by weight.

The test for flame retardancy which included determination of the burning time and percent sample consumed was carried out as follows: A specimen of the cured, filled and modified organopolysiloxane, 0.075 x 0.5 x 6" was suspended vertically in a glass tube (2" inside diameter by 6" long) by means of a wire pierced through the center 0.5 inch from the top of the specimen. A Bunsen burner flame (approximate temperature 2000° F.) was placed so that the lower 0.75" of the specimen was in the center of the flame. After the specimen had been in the flame for 20 seconds, the burner was removed and the duration of burning was timed. The sample was considered as burning until all visible glowing had ceased. The sample was then removed from the glass tube and struck sharply at least three times against a hard, flat surface. The proportion of the sample remaining after these blows was used to determine the unburned volume of the sample. For optimum suitability, the burning time should be below 110 seconds and percent consumed below 50 percent.

The finely divided copper, cupric oxide, cuprous oxide, and cuprous chloride employed in the following examples had an average particle size of about 10 to 25 microns. The copper powder used and identified as "Copper Powder" contained small amounts of cuprous oxide, about 100% of the copper powder passing through a 325-mesh screen, as described above.

For comparison purposes, in the following examples, other metallic and inorganic materials such as antimony oxide, nickel carbonate, copper carbonate $[CuCO_3 \cdot Cu(OH)_2]$, aluminum powder, glass fusing frit, and zinc carbonate were tested along with the cupreous mixtures of the invention herein defined.

EXAMPLE 1

A heat-curable, toluene-soluble organopolysiloxane convertible to the cured, solid, elastic state was obtained by condensing 100 parts octamethylcyclotetrasiloxane with 15 parts octaphenylcyclotetrasiloxane in the presence of about 0.01 part KOH until a highly viscous mass bordering on a gummy solid was obtained. This product had a ratio of approximately two total methyl and phenyl groups per silicon atom and contained about 5.3 mol percent silicon-bonded phenyl groups. Various formulations were prepared from this convertible methyl phenylpolysiloxane, in which cupreous additives, including the copper and copper-copper oxide mixtures of the instant invention, were incorporated in varying proportions. Other modifying agents, which will be hereinafter identified, were also tested as additives in this convertible organopolysiloxane, for flame-retardant properties. The basic formulation employed, exclusive of flame-retardant additive, and identified as "Formulation 1" was composed of 100 parts of the convertible methyl phenylpolysiloxane, 45 parts silica aerogel (Santocel CS), and 2.0 parts benzoyl peroxide. Each formulation was molded into flat sheets for 10 minutes at 127° C. and then heated in an air-circulating oven for 1 hour at 150° C. The following Table I shows the additive used and relative proportions of additive employed. Table I also shows the flame-retardant properties of the various cured materials (which were tested for burning time and percent of sample consumed after heat-aging for 1 hour at 150° C.).

*Table I*

| Sample No. | Formulation No. | Additive | Percent Additive [1] | Seconds Burning Time | Percent Consumed |
|---|---|---|---|---|---|
| 1 | 1 | $Sb_2O_3$ | 5 | 64 | 100 |
| 2 | 1 | $Sb_2O_3$ | 20 | 120 | 100 |
| 3 | 1 | $NiCO_3$ | 5 | 147 | 70 |
| 4 | 1 | $NiCO_3$ | 20 | 141 | 75 |
| 5 | 1 | $CuCO_3 \cdot Cu(OH)_2$ | 5 | 139 | 100 |
| 6 | 1 | Glass fusing frit | 22 | 163 | 100 |
| 7 | 1 | $ZnCO_3$ | 5 | 160 | 50 |
| 8 | 1 | $ZnCO_3$ | 20 | 125 | 50 |
| 9 | 1 | Aluminum powder | 5 | 210 | 60 |
| 10 | 1 | do | 20 | 180 | 100 |
| 11 | 1 | Copper powder | 1 | 64 | 20 |
| 12 | 1 | do | 2 | 73 | 20 |
| 13 | 1 | do | 4 | 74 | 20 |
| 14 | 1 | do | 5 | 66 | 25 |
| 15 | 1 | do | 10 | 77 | 35 |
| 16 | 1 | do | 20 | 102 | 30 |
| 17 (Control)[2] | 1 | None | | 236 | 100 |

[1] Based on weight of convertible methylphenylpolysiloxane.
[2] After 4 hours at 150° C.

The physical properties of sample Numbers 11, 12, 13 and control sample No. 17 were established, particularly the tensile strength and elongations after the initial molding cycle followed by a heat treatment for 1 hour at 150° C. Table II shows the results of these physical tests.

*Table II*

| Sample No. | 1 hr./150° C. | |
|---|---|---|
| | Tensile, p.s.i. | Percent Elongation |
| 11 | 870 | 263 |
| 12 | 865 | 290 |
| 13 | 815 | 305 |
| 17 | 800 | 260 |

EXAMPLE 2

This example illustrates the use of the filled silicone gum employed in Example 1 in which finely divided titanium dioxide, and in some instances finely divided diatomaceous earth (Celite Superfloss), were also added, employing the same finely divided copper of Example 1. Table III below, in which the values shown for the various ingredients are parts, by weight, shows the formulations employed in each instance. Table III also shows the properties of the various formulations after they were molded for 10 minutes at 127° C. and oven-cured for varying lengths of time as stipulated at 150° C., including in some instances the tensile and elongation properties, together with burning time in seconds and the percent sample consumed in each instance. All the properties recited in Table III for sample Nos. 18, 19 and 20 were determined after heat-aging the molded samples for 1 hour at 150° C. All the properties for sample No. 21 were determined after heat-aging the molded samples for 2 hours at 150° C., while all the properties for sample No. 22 were determined after heat-aging the molded samples for 17 hours at 150° C.

*Table III*

| Ingredient | Sample Number | | | | |
|---|---|---|---|---|---|
| | 18 | 19 | 20 | 21 | 22 |
| Convertible methyl phenylpolysiloxane (described in Example 1) | 125 | 125 | 96 | 82 | 82 |
| Silica aerogel | 55 | 55 | 43 | 37 | 37 |
| Titanium dioxide powder | 2 | 10 | 14 | 13 | 12 |
| Diatomaceous earth | | | | 12 | 36 |
| Benzoyl peroxide | 2.5 | 2.5 | 1.9 | 1.6 | 1.6 |
| Copper powder | 1.8 | 1.8 | 1.4 | 1.8 | 1.8 |
| Tensile strength, p.s.i. | 835 | 900 | 845 | 960 | 835 |
| Percent elongation | 280 | 330 | 300 | 270 | 135 |
| Burning time, seconds | 68 | 65 | 87 | 82 | 50 |
| Percent consumed | 25 | 17 | 10 | 10 | 7 |

EXAMPLE 3

In this example a different type of convertible organopolysiloxane was used in place of the one employed in Examples 1 and 2. More particularly, the convertible organopolysiloxane comprised a mixture of convertible gums of which 96%, by weight, was the methyl phenylpolysiloxane employed in Examples 1 and 2, and 4%, by weight, was a straight methylpolysiloxane gum obtained by condensing octamethylcyclotetrasiloxane with a small amount of an alkaline condensing agent in the same manner as that described in Example 1 to yield a methylpolysiloxane gum containing an average of about two methyl groups per silicon atom. This mixture of methyl phenylpolysiloxane and methylpolysiloxane gums will hereinafter be referred to as "mixed convertible organopolysiloxanes." Samples were molded of formulations shown in the following Table IV for 10 minutes at 127° C. and then heat-treated for 1 hour at 150° C. The finely divided silica used as the main filler with the mixed convertible organopolysiloxanes was a fume silica identified as Cab—O—Sil and sold by Godfrey L. Cabot, Inc., of Boston, Massachusetts. All the values recited in Table IV are parts by weight. The cupreous material used in this example was the finely divided copper powder used in Example 1.

*Table IV*

| Ingredient | Sample Number | | | | | |
|---|---|---|---|---|---|---|
| | 23 | 24 | 25 | 26 | 27 | 28 |
| Mixed convertible organopolysiloxanes | 120 | 120 | 120 | 120 | 170 | 200 |
| Fume silica | 55 | 55 | 55 | 55 | 75 | 90 |
| TiO₂ | 2.5 | 2.5 | 4.5 | 7.5 | 30 | 42 |
| Diatomaceous earth | | | | | | 60 |
| Benzol peroxide | 2.1 | 2.1 | 2.1 | 2.1 | 2.9 | 3.5 |
| Copper powder | 1.35 | 1.8 | 1.35 | 1.35 | 2.5 | 4.5 |
| Quartz fibers | | | 27 | | 37.8 | |
| Tensile strength, p.s.i. | 1,120 | 725 | 850 | 880 | 800 | 715 |
| Percent elongation | 380 | 230 | 260 | 255 | 290 | 190 |
| Burning time, seconds | 64 | 55 | 64 | 68 | 66 | 79 |
| Percent consumed | 5 | 5 | <5 | 15 | 15 | 16 |

EXAMPLE 4

In this example, a gum formulation was prepared from 100 parts of the mixture of convertible organopolysiloxanes described in Example 3 (of which 96 parts was the methyl phenylorganopolysiloxane and 4 parts was the methylpolysiloxane), 42 parts fume silica, 10 parts diatomaceous earth, 2 parts of titanium dioxide and 2.9 parts bis(2,4-dichlorobenzoyl) peroxide. This material was identified as "formulation No. 2." Employing formation No. 2, three molding compounds were prepared in which the following Table V shows the ingredients used, together with the proportions of said ingredients. The cupreous material used in one instance comprised the copper powder employed in Example 1, while in another instance the cupreous material comprised cupric oxide (CuO). A control was also compounded in which the cupreous material was omitted entirely from the formulation. After making up the various compounds, they were molded into the form of flat sheets at 127° C. for about 10 minutes and thereafter heat-aged in an oven for five hours at 150° C. and then tested for tensile strength, percent elongation, burning time and percent consumed. The following Table V also shows the results of the various tests conducted on the molded and heat-treated samples.

*Table V*

| Ingredient | Sample Number | | |
|---|---|---|---|
| | 29 | 30 | 31 |
| Formulation No. 2 | 100 | 100 | 100 |
| Diatomaceous earth | 20 | 20 | 20 |
| Titanium dioxide | 11 | 11 | 11 |
| Bis(2,4-dichlorobenzoyl) peroxide | 1.44 | 1.44 | 1.44 |
| Copper powder | | 1.75 | |
| CuO | | | 1.75 |
| Tensile strength, p.s.i. | 935 | 920 | 815 |
| Percent elongation | 150 | 170 | 140 |
| Burning time, seconds | 187 | 42 | 39 |
| Percent consumed | 30 | 5 | <5 |

EXAMPLE 5

To 100 parts of formulation No. 2, more particularly described in Example 3, were added 10 parts additional diatomaceous earth, 10.8 parts titanium dioxide and 1.5 parts cuprous oxide (Cu₂O). The mixture of ingredients was then molded into the form of flat sheets for 10 minutes at 127° C. and thereafter heat-treated for 4 hours at 150° C. and then 4 hours at 250° C. in an oven, and samples thereof tested for burning time and percent consumed, in the manner described in the above examples. As a result of these tests, it was found that the burning time for the sample was 102 seconds and the percent consumed was 15%.

EXAMPLE 6

This example illustrates the effect of employing a cupreous material in combination with a convertible organopolysiloxane which is free of silicon-bonded aromatic, for instance, silicon-bonded phenyl groups. More particularly, a convertible polydimethylsiloxane obtained by condensing octamethylcyclotetrasiloxane with about 0.01%, by weight, potassium hydroxide at elevated temperatures until a high molecular weight viscous material (about 4 to 6 million centistokes when measured at about 38° C.) was obtained. To 100 parts of this convertible methylpolysiloxane (which had a ratio of about two methyl groups per silicon atom) were added on compounding rolls 42 parts silica aerogel and 1.65 parts benzoyl peroxide. To 100 parts of this mixture of ingredients were then added 1.75 parts cupric oxide. The sample was molded for 10 minutes at 127° C. and then heat-treated for 24 hours at 250° C. and then tested for burning time and percent consumed. These tests showed that the burning time was of the order of 110 seconds and that it was 100% consumed.

EXAMPLE 7

To 100 parts of formulation No. 2, described in Example 4, were added 1.75 parts of various finely divided additives including copper, cupric oxide, and cuprous chloride. A control was also prepared using formulation No. 2 alone and omitting any additive. Each of these samples was molded in the form of flat sheets for 10 minutes at 127° C. and thereafter given an additional heat-treatment comprising four hours at 150° C. in an air-circulating oven. The following Table VI shows the additive used, the percent additive, the burning time in seconds, and the percent consumed for each sample.

*Table VI*

| Sample No. | Additive | Parts Additive | Burning Time, Seconds | Percent Consumed |
|---|---|---|---|---|
| 32 | None | | 170 | 70 |
| 33 | Cu | 1.75 | 17 | 10 |
| 34 | CuO | 1.75 | 50 | 10 |
| 35 | CuCl | 1.75 | 46 | 15 |
| 36 | CuCl | 5.00 | 22 | 15 |

It will, of course, be apparent to those skilled in the art that instead of using the particular organopolysiloxane containing silicon-bonded aromatic radicals, for instance, phenyl radicals, described above, other organopolysiloxanes containing different silicon-bonded aromatic radicals, or silicon-bonded phenyl radicals in different proportions, many examples of which aromatic radicals have been given above, may be employed without departing from the scope of the invention. The proportions of ingredients may be varied widely, especially the fillers and the curing agents and other types of curing agents, such as tertiary butyl perbenzoate may also be employed. The amount of cupreous material used may be varied within fairly wide limits but is advantageously within the range of from about 0.25 to 20%, preferably within the range of from about 0.5 to 10%, by weight, based on the weight of the convertible organopolysiloxane.

In addition to the cupreous materials recited in the above examples, one may also use, for instance, mixtures of copper and copper oxide, mixed salts of copper and copper oxide or mixed salts of copper chloride and copper oxide (e.g., cupric oxychloride), other copper halides, for instance, cupric chloride, cuprous fluoride, cupric bromide, etc. In certain applications where it is desirable that the color of the cured silicone rubber be white or free of any undesirable coloration, it has been found that the copper and cupric oxide types of cupreous materials are preferred since materials such as the cupric or cuprous chloride tend to impart a greenish tinge to the curable, filled compound in which it is present and this tinge is deepened to a darker green upon heat curing. However, in applications where color is of no importance or where it can be acceptably masked, the copper halides can usually be satisfactorily employed.

Various uses can be made of the compositions herein described. Thus, the compounds of the invention can be used for insulating electrical conductors by extruding the silicone rubber compound containing the cupreous material onto a metallic conducting core (e.g., copper, aluminum alloys of copper, etc.) and thereafter heat-treating the insulated conductor at elevated temperatures in an oven or in steam until vulcanizations is effected. Conductors so formed are flame-resistant and can withstand elevated temperatures for long periods of time, more so than insulated conductors in which the cupreous material is absent.

Other applications in which the claimed invention can be employed where resistance to extremely high temperatures are desirable and where ordinary silicone rubbers will ignite and continue to burn, are in gaskets, grommets, seals, heater ducts, protective insulations, various types of equipment such as wrap-around tapes for elements which may be subjected to elevated temperatures, etc. Dispersions or dispersion-solutions of the materials embraced by the instant invention can be used to coat various heat-resistant cloths such as asbestos cloth, glass cloth, etc., and these wound around mandrels to make various tubes or conduit material useful in conducting heat to various sections of an airplane. One particular application for which the invention herein described is exceptionally suitable is in connection with flaps to be employed for tents which are intended to house stoves whose chimneys have exits through the top of the tent. Obviously, the usual tent material will not withstand the high temperatures immediately adjacent such chimneys. However, by inserting at this point a section of the flame-retardant silicone rubber described in the present application, it is possible to obviate the danger of fires, which may spread to the balance of the tents should the chimney of the stove become overheated for any reason.

What I claim as new and desire to secure by Letters Patent of the United States is:

1. A composition of matter which in the cured state exhibits improved flame-retardant properties, which composition comprises (1) an organopolysiloxane convertible to the cured, solid, elastic state consisting essentially of silicon atoms, oxygen atoms, methyl groups, and an aromatic radical selected from the class consisting of aryl and halogenated aryl radicals, the said organopolysiloxane containing from 3 to 35 mol percent silicon-bonded aromatic groups, there being present from 1.98 to 2.05 total organic groups per silicon atom, (2) a finely divided inorganic filler, the filler comprising from 25 to 300 percent, by weight, of the weight of the convertible organopolysiloxane, (3) from 0.25 to 20 percent, by weight, based on the weight of (1) a finely divided cupreous material present in an amount sufficient to impart flame-retardant properties to the cured, solid, elastic organopolysiloxane, the said cupreous material being selected from the class consisting of copper, copper oxides, copper halides, and mixtures of the aforesaid cupreous materials, and (4) a peroxy curing agent for (1).

2. The cured product of claim 1.

3. A composition as in claim 1 in which the filler is a finely divided silica filler.

4. A composition of matter which in the cured state exhibits improved flame-retardant properties, which composition comprises (1) an organopolysiloxone convertible to the cured, solid, elastic state consisting essentially of silicon atoms, oxygen atoms, methyl groups, and an aromatic radical selected from the class consisting of aryl and halogenated aryl radicals, the said organopolysiloxane containing from 3 to 35 mol percent silicon-bonded aromatic groups, there being present from 1.98 to 2.05 total organic groups per silicon atom, (2) a filler comprising finely divided silica, the silica comprising from 25 to 300 percent, by weight, based on the weight of the convertible organopolysiloxane, (3) from 0.25 to 20 percent, by weight, based on the weight of (1) of a finely divided cupric oxide present in an amount sufficient to impart flame-retardant properties to the cured, solid, elastic organopolysiloxane, and (4) a peroxy curing agent for (1).

5. A composition of matter which in the cured state exhibits improved flame-retardant properties, which composition comprises (1) a methyl phenylpolysiloxane convertible to the cured, solid, elastic state consisting essentially of silicon atoms, oxygen atoms, methyl groups and phenyl groups, the said methyl phenylpolysiloxane containing from 3 to 35 mol percent silicon-bonded phenyl groups and there being present from 1.98 to 2.05 total methyl and phenyl groups per silicon atom, (2) a finely divided silica filler, the filler comprising, by weight, from 25 to 300 percent of the weight of the convertible methyl phenylpolysiloxane, (3) from 0.25 to 20 percent, by weight, based on the weight of (1) of a finely divided cupreous material present in an amount sufficient to impart flame-retardant properties to the cured, solid, elastic organopolysiloxane, the said cupreous material being selected from the class consisting of copper, copper oxides, copper halides, and mixtures of the aforesaid cupreous materials, and (4) a peroxy curing agent for (1).

6. The cured product of claim 5.

7. A composition of matter which in the cured state exhibits improved flame-retardant properties, which composition comprises (1) a methyl phenylpolysiloxane convertible to the cured, solid, elastic state consisting essentially of silicon atoms, oxygen atoms, methyl groups and phenyl groups, the said methyl phenylpolysiloxane containing from 3 to 35 mol percent silicon-bonded phenyl groups and there being present from 1.98 to 2.05 total methyl and phenyl groups per silicon atom, (2) a finely divided silica filler, the filler comprising, by weight, from 25 to 300 percent of the weight of the convertible methyl phenylpolysiloxane, (3) from 0.25 to 20 percent, by weight, based on the weight of (1) of finely divided cupric oxide, and (4) benzoyl peroxide.

8. The heat-treated product of claim 7.

9. A composition of matter which in the cured state exhibits improved flame-retardant properties, which composition comprises (1) a methyl phenylpolysiloxane convertible to the cured, solid, elastic state consisting essentially of silicon atoms, oxygen atoms, methyl groups and phenyl groups, the said methyl phenylpolysiloxane containing from 3 to 35 mol percent silicon-bonded phenyl groups and there being present from 1.98 to 2.05 total methyl and phenyl groups per silicon atom, (2) a finely divided silica filler, the filler comprising, by weight, from 25 to 300 percent of the weight of the convertible methyl phenylpolysiloxane, (3) from 0.25 to 20 percent, by weight, based on the weight of (1) of finely divided cupric oxide, and (4) bis(2,4-dichlorobenzoyl) peroxide.

10. The heat-treated product of claim 9.

11. A composition of matter which in the cured state exhibits improved flame-retardant properties, which composition comprises (1) a methyl phenylpolysiloxane convertible to the cured, solid, elastic state consisting essentially of silicon atoms, oxygen atoms, methyl groups and phenyl groups, the said methyl phenylpolysiloxane containing from 3 to 35 mol percent silicon-bonded phenyl groups and there being present from 1.98 to 2.05 total methyl and phenyl groups per silicon atom, (2) a finely divided silica filler, the filler comprising, by weight, from 25 to 300 percent of the weight of the convertible methyl phenylpolysiloxane, (3) from 0.25 to 20 percent, by weight, based on the weight of (1) of finely divided copper, and (4) a peroxy curing agent for (1).

12. A composition of matter which in the cured state exhibits improved flame-retardant properties, which composition comprises (1) a methyl phenylpolysiloxane convertible to the cured, solid, elastic state consisting essentially of silicon atoms, oxygen atoms, methyl groups and phenyl groups, the said methyl phenylpolysiloxane containing from 3 to 35 mol percent silicon-bonded phenyl groups and there being present from 1.98 to 2.05 total methyl and phenyl groups per silicon atom, (2) a finely divided silica filler, the filler comprising, by weight, from 25 to 300 percent of the weight of the convertible methyl phenylpolysiloxane, (3) from 0.25 to 20 percent, by weight, based on the weight of (1) of cuprous oxide, and (4) a peroxy curing agent for (1).

13. A composition of matter which in the cured state exhibits improved flame-retardant properties, which composition comprises (1) a methyl phenylpolysiloxane convertible to the cured, solid, elastic state consisting essentially of silicon atoms, oxygen atoms, methyl groups and phenyl groups, the said methyl phenylpolysiloxane containing from 3 to 35 mol percent silicon-bonded phenyl groups and there being present from 1.98 to 2.05 total methyl and phenyl groups per silicon atom, (2) a finely divided silica filler, the filler comprising, by weight, from 25 to 300 percent of the weight of the convertible methyl phenylsiloxane, (3) from 0.25 to 20 percent, by weight, based on the weight of (1) of cuprous chloride, and (4) a peroxy curing agent for (1).

14. The process for improving the flame-retardant properties of a filled organopolysiloxane convertible to the cured, solid, elastic state consisting essentially of silicon atoms, oxygen atoms, methyl groups and an aromatic radical selected from the class consisting of aryl and halogenated aryl radicals, the said organopolysiloxane containing from 3 to 35 mol percent silicon-bonded aromatic groups and from 0 to 2 mol percent silicon-bonded vinyl groups, there being present from 1.98 to 2.05 organic groups per silicon atom, and the filler for the organopolysiloxane comprising, by weight, from 25 to 300 percent of the weight of the convertible organopolysiloxane, which process comprises incorporating in the aforesaid filled organopolysiloxane from 0.25 to 20 percent, by weight, based on the weight of the organopolysiloxane of a cupreous material selected from the class consisting of copper, copper oxides, copper halides and mixtures of the aforesaid cupreous materials, and a peroxy curing agent.

15. The process as in claim 14 in which the convertible organopolysiloxane is a methyl phenylpolysiloxane and the cupreous material is cupric oxide.

16. The process as in claim 14 in which the convertible organopolysiloxane is a methyl phenylpolysiloxane and the cupreous material is a mixture of copper and cupric oxide.

17. The process as in claim 14 in which the convertible organopolysiloxane is a methyl phenylpolysiloxane and the cupreous material is finely divided copper.

References Cited in the file of this patent

UNITED STATES PATENTS

| | | |
|---|---|---|
| 2,480,620 | Warrick | Aug. 30, 1949 |
| 2,593,817 | Waggoner | Apr. 22, 1952 |
| 2,645,588 | Barry | July 14, 1953 |
| 2,650,206 | Stock | Aug. 25, 1953 |
| 2,684,349 | Welton | July 20, 1954 |